US008803356B2

(12) United States Patent
Yokozutsumi

(10) Patent No.: US 8,803,356 B2
(45) Date of Patent: Aug. 12, 2014

(54) CONTROLLER FOR AC ELECTRIC TRAIN

(75) Inventor: Ryo Yokozutsumi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 636 days.

(21) Appl. No.: 12/667,709

(22) PCT Filed: Aug. 22, 2007

(86) PCT No.: PCT/JP2007/066307
§ 371 (c)(1),
(2), (4) Date: Jan. 5, 2010

(87) PCT Pub. No.: WO2009/025049
PCT Pub. Date: Feb. 26, 2009

(65) Prior Publication Data
US 2010/0176655 A1    Jul. 15, 2010

(51) Int. Cl.
*B60L 1/00* (2006.01)
*B60L 9/28* (2006.01)
*B60L 3/00* (2006.01)
*B60L 9/00* (2006.01)

(52) U.S. Cl.
CPC ... *B60L 9/28* (2013.01); *B60L 3/00* (2013.01); *B60L 2200/26* (2013.01); *B60L 9/005* (2013.01)
USPC ............................. 307/9.1; 307/10.1; 318/801

(58) Field of Classification Search
CPC ...... Y02T 10/7005; B60R 16/03; H02P 27/08
USPC .................... 307/9.1, 10.1; 318/801
See application file for complete search history.

(56) References Cited

U.S. PATENT DOCUMENTS

| 4,730,245 A | 3/1988 | Sato |
| 5,847,534 A * | 12/1998 | Tanamachi et al. ........... 318/801 |

(Continued)

FOREIGN PATENT DOCUMENTS

| JP | 62-217803 A | 9/1987 |
| JP | 64-060206 A | 3/1989 |

(Continued)

OTHER PUBLICATIONS

English machine translation of JP Pub. No. 06-046501.*

(Continued)

*Primary Examiner* — Jared Fureman
*Assistant Examiner* — Alfonso Perez Borroto
(74) *Attorney, Agent, or Firm* — Buchanan Ingersoll & Rooney P.C.

(57) ABSTRACT

In a controller for an AC electric train capable of power running and regenerative running, and capable of detecting a power failure in an AC overhead wire for supplying AC electric power, a power failure in the AC overhead wire is swiftly and reliably detected. A power failure detector provided in an electric-train control unit includes a specific-frequency-signal calculating unit that extracts a current component corresponding to a specific-frequency set value from a main-transformer output-current detection signal and outputs an extracted signal as a specific-frequency current signal, a subtracter that subtracts the main-transformer output-current detection signal from the specific-frequency current signal and outputs a result of the subtraction as a current deviation, and a power-failure detecting unit that compares the current deviation with a predetermined power-failure-detection set value, and outputs a power-failure detection signal when the current deviation is greater than the power-failure-detection set value.

2 Claims, 2 Drawing Sheets

(56) References Cited

U.S. PATENT DOCUMENTS

| | | |
|---|---|---|
| 6,278,256 B1 * | 8/2001 | Aoyama .................. 318/801 |
| 2008/0122393 A1 * | 5/2008 | Negoro et al. ............. 318/552 |
| 2010/0079093 A1 * | 4/2010 | Kitanaka ................ 318/400.3 |

FOREIGN PATENT DOCUMENTS

| | | |
|---|---|---|
| JP | 64-60206 A | 3/1989 |
| JP | 01-259702 | 10/1989 |
| JP | 4-117103 A | 4/1992 |
| JP | 6-46501 A | 2/1994 |
| JP | 06-169501 | 6/1994 |
| JP | 6-197401 A | 7/1994 |

OTHER PUBLICATIONS

English machine translation of JP Pub. No. 06-169501.*
International Search Report for PCT/JP2007/066307 completed Nov. 20, 2007.
Written Opinion for PCT/JP2007/066307 completed Nov. 20, 2007.
Supplementary European Search Report dated Jul. 6, 2010, issued in the corresponding European Application No. 07805979.7-2207.
Office Action from Canadian Patent Office date Sep. 17, 2013, issued in corresponding Canadian Patent Application No. 2,692,508.

* cited by examiner

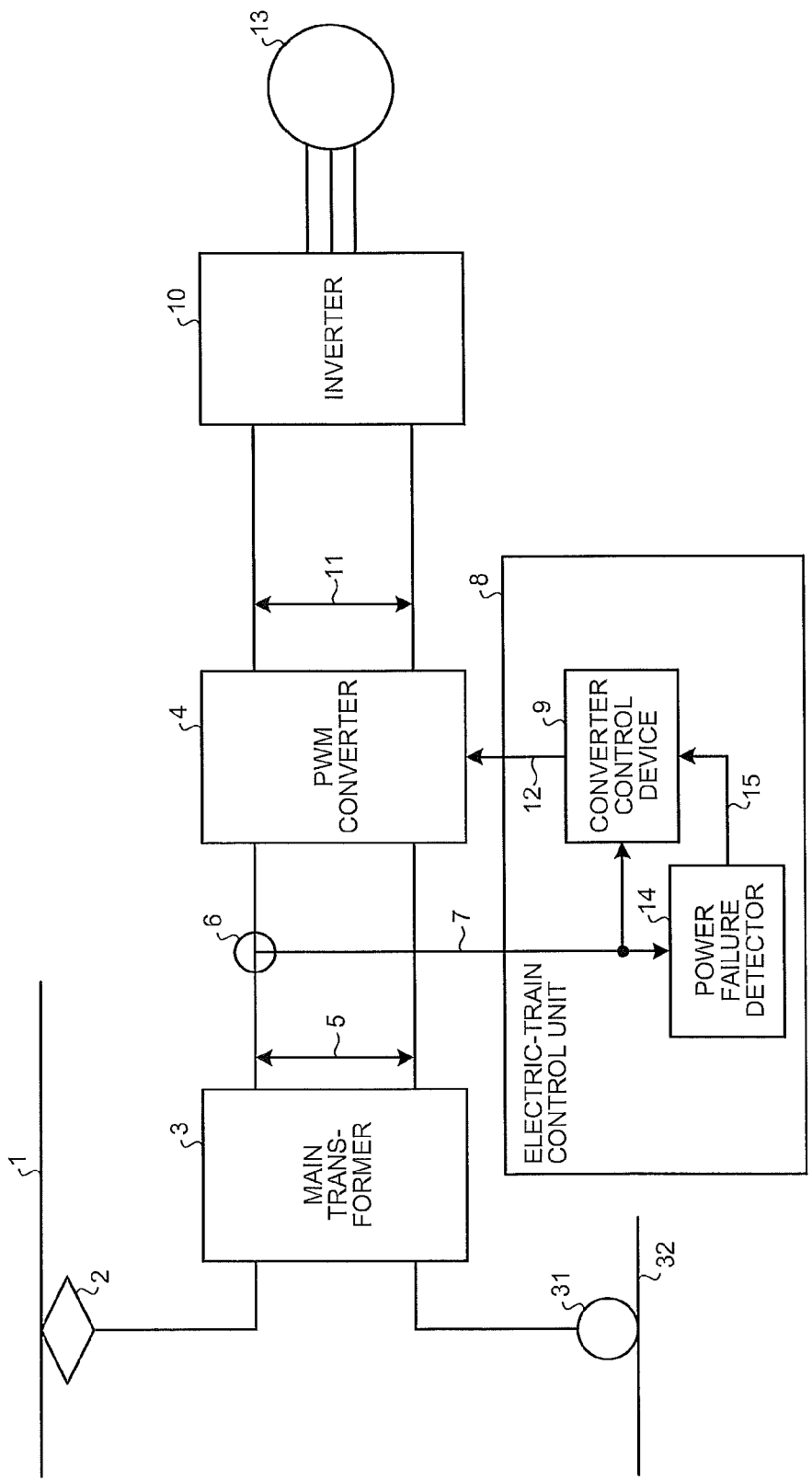

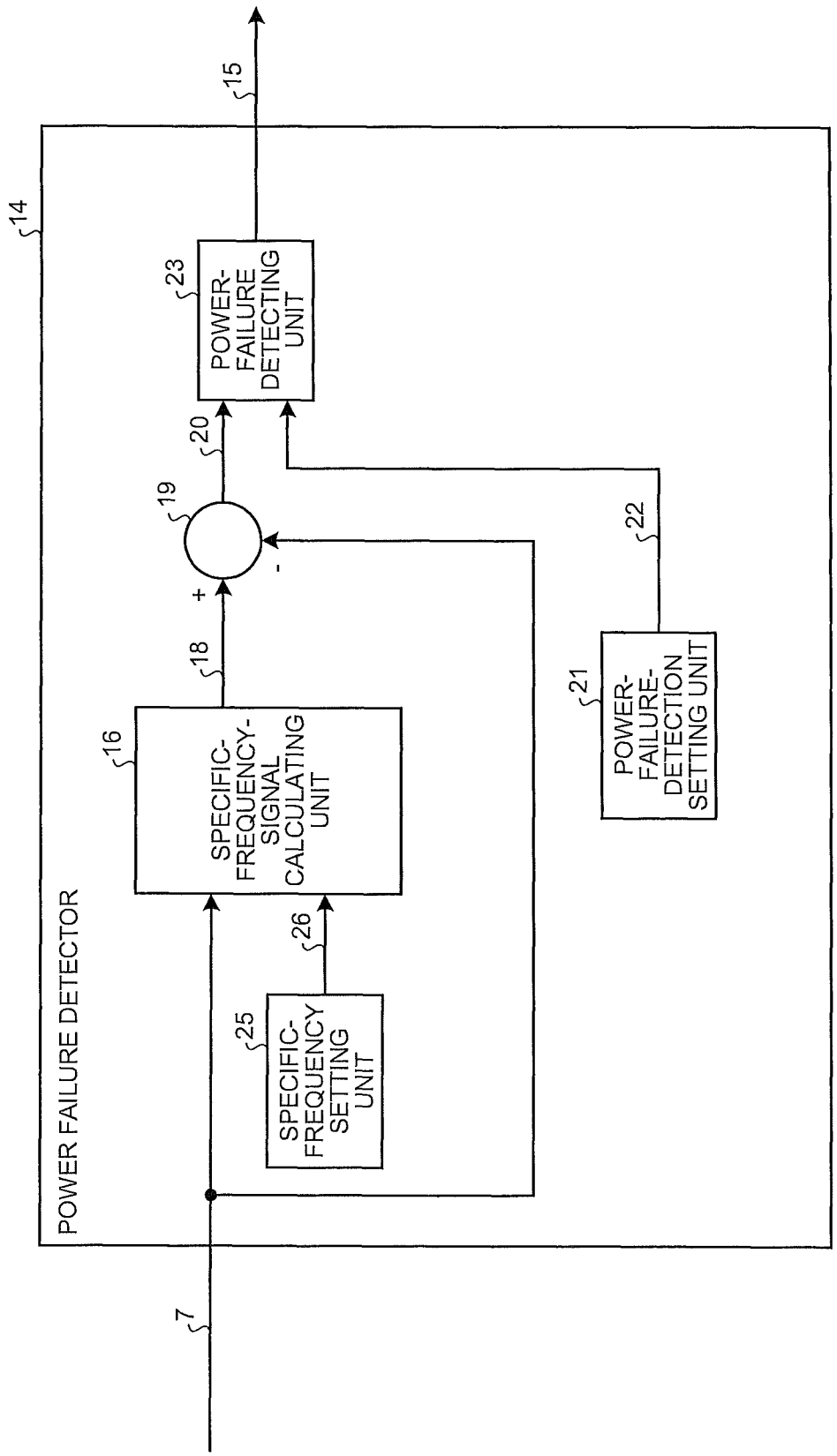

CONTROLLER FOR AC ELECTRIC TRAIN

TECHNICAL FIELD

The present invention relates to a controller for an AC electric train that is driven by an AC motor, and, more particularly to a controller for an AC electric train having a function of detecting a power failure in an overhead wire (hereinafter, "AC overhead wire") through which AC electric power is supplied.

BACKGROUND ART

According to a conventional controller for an AC electric train, it is first detected for a current signal of a specific frequency component that is applied from a substation to an AC overhead wiring whether there is a specific frequency component superimposed in the substation using a wave detector on an input side of a main transformer. A power failure is detected by a fact that a current signal of the specific frequency component detected by the wave detector could not be detected due to opening of a breaker of a feeding system (see Patent Document 1, for example).

Patent Document 1: Japanese Patent Application Laid-open No. H6-197401 (Page 3 and FIG. 2)

DISCLOSURE OF INVENTION

Problem to be Solved by the Invention

However, in the controller for an AC electric train according to the conventional technique as typified by Patent Document 1 mentioned above, the presence of a detection result of a specific frequency current that flows through the wave detector provided on the input side of the main transformer is used as a determination value for the power failure detection. Therefore, when a plurality of electric trains are connected as loads of the substation, travel of the electric train is delayed due to erroneous detection of the power failure because a current value of the wave detector is high, which hinders smooth travel of the electric train.

Meanwhile, in this conventional technique, it is possible to change a power-failure-detection set value to lower the probability of the erroneous detection. In this case, however, there is a problem that detection of a power failure at interruption of a feeding circuit is delayed, overcurrent flows through a ground installation such as a substation depending on conditions, which may cause the device to break down.

The present invention has been achieved in view of the above problems, and an object of the present invention is to provide a controller for an AC electric train capable of detecting a power failure more swiftly and more reliably than the conventional technique when a power failure is to be detected using a current signal.

Means for Solving Problem

In order to solve the aforementioned problems, a controller for an AC electric train according to one aspect of the present invention is constructed in such a manner as to include: a converter that converts an AC voltage input from an AC overhead wire through a transformer, into a DC voltage; an inverter that converts a DC voltage of the converter into an AC voltage and outputs the same to an AC motor; a current detector that detects an output current of the transformer; and a control unit including a converter control device that controls an output of the converter in accordance with a gate enable signal based on a detection current signal detected by the current detector, and a power failure detector that detects a power failure occurring in the AC overhead wire based on the detection current signal, wherein the power failure detector includes: a specific-frequency-signal calculating unit that extracts a current component corresponding to a predetermined specific-frequency set value from the detection current signal and outputs the extracted signal as a specific-frequency current signal; a subtracter that subtracts the detection current signal from the specific-frequency current signal and outputs a result of subtraction as a current deviation; and a power-failure detecting unit that compares the current deviation and a predetermined power-failure-detection set value with each other, and outputs a power-failure detection signal when the current deviation is greater than the power-failure-detection set value, and wherein the converter control device stops the operation of the converter by stopping the gate enable signal based on the power-failure detection signal.

Effect of the Invention

According to the controller for an AC electric train of the present invention capable of power running and regenerative running and capable of detecting a power failure in an AC overhead wire through which AC electric power is supplied, a current component corresponding to a predetermined specific-frequency set value is extracted as a specific-frequency current signal from a detection current signal obtained by detecting an output current of a transformer, and a power-failure detection signal is output when a current deviation that is a subtraction result obtained by subtracting the detection current signal from the extracted specific-frequency current signal is greater than a predetermined power-failure-detection set value. Thus, a power failure in the AC overhead wire can be detected swiftly and reliably.

BRIEF DESCRIPTION OF DRAWINGS

FIG. 1 depicts a structure of a drive system and a control system of an AC electric train according to an exemplary embodiment of the present invention.

FIG. 2 depicts a detailed structure of a power failure detector shown in FIG. 1.

EXPLANATIONS OF LETTERS OR NUMERALS

1 AC overhead wire
2 pantagraph
3 main transformer
4 PWM converter
5 main-transformer output voltage
6 current detector
7 main-transformer output-current detection signal
8 electric-train control unit
9 converter control device
10 inverter
11 DC output voltage
12 gate enable signal
13 motor
14 power failure detector
15 power-failure detection signal
16 specific-frequency-signal calculating unit
18 specific-frequency current signal
19 subtracter
20 current deviation
21 power-failure-detection setting unit
22 power-failure-detection set value 23 power-failure detecting unit
25 specific-frequency setting unit
26 specific-frequency set value
31 wheel
32 rail

BEST MODE(S) FOR CARRYING OUT THE INVENTION

Exemplary embodiments of a controller for an AC electric train according to the present invention will be explained below in detail with reference to the accompanying drawings. The present invention is not limited to the embodiments.

(Structure of AC Electric Train)

FIG. 1 depicts a structure of a drive system and a control system of an AC electric train according to an exemplary embodiment of the present invention. As shown in FIG. 1, the drive system of the AC electric train includes a main transformer 3 using AC electric power as an input, a pulse width modulation (PWM) converter 4 using an AC output of the main transformer 3 as an input, an inverter 10 using a DC output of the PWM converter 4 as an input, and one or more motors 13 that are driven by AC output of the inverter 10. Preferable examples of the motor 13 are an induction motor and a synchronous motor.

Meanwhile, the control system of the AC electric train includes an electric-train control unit 8 that controls the PWM converter 4 based on a current detector 6 and a main-transformer output-current detection signal 7. The current detector 6 detects an output current of the main transformer 3. The main-transformer output-current detection signal 7 is an output of the current detector 6. The electric-train control unit 8 includes a converter control device 9 and a power failure detector 14, and is configured to input the main-transformer output-current detection signal 7 to both of the converter control device 9 and the power failure detector 14.

Further, one end on a primary side of the main transformer 3 is connected to an AC overhead wire 1 through a pantagraph 2, and the other end thereof is connected to a rail 32 that is a ground potential through a wheel 31. That is, electric power transmitted from a substation (not shown) is received through the AC overhead wire 1, the pantagraph 2, the wheel 31, and the rail 32.

(Operation of AC Electric Train)

An operation of the AC electric train is explained next. In the explanations, the operation of the AC electric train is divided into an operation in normal conditions (when power does not fail) and an operation at detection of a power failure when power fails.

(Operation in the Normal Condition)

The operation in the normal conditions (when power does not fail) is explained first. When AC electric power collected from the AC overhead wire 1 through the pantagraph 2 is supplied to the main transformer 3, the main transformer 3 outputs a lowered AC voltage to the PWM converter 4 as a main-transformer output voltage 5. The PWM converter 4 converts the input main-transformer output voltage 5 into a desired DC voltage, and outputs the converted DC voltage to the inverter 10 as a DC output voltage 11. The current detector 6 detects a current flowing between buses that connect the main transformer 3 and the PWM converter 4 with each other, and outputs a detected signal to the converter control device 9 and the power failure detector 14 of the electric-train control unit 8 as the main-transformer output-current detection signal 7. The converter control device 9 performs output control on a gate enable signal 12 for keeping the DC output voltage 11 generated by the PWM converter 4 using the main-transformer output voltage 5 at a constant value based on the main-transformer output-current detection signal 7. That is, an output level of the DC output voltage 11 output from the PWM converter 4 to the inverter 10 is controlled by the gate enable signal 12 output from the converter control device 9. The inverter 10 converts the input DC output voltage 11 into an AC voltage of a desired frequency and a desired potential, and outputs the same to the motor 13. The motor 13 controls running of the electric train using the input AC voltage.

At the time of power running (at the time of acceleration control) of the electric train, the electric power is converted as described above to accelerate the motor 13, while at the time of braking (at the time of deceleration), the motor 13 is operated as a power generator. At that time, the inverter 10 functions as a converter, and the PWM converter 4 functions as an inverter to apply AC-power regenerative braking.

(Operation at the Detection of Power Failure)

An operation at detection of a power failure is explained below. Before that, the reason why a power failure needs to be detected reliably and swiftly is explained. A case in which a breaker of the substation is turned OFF due to an accident of a ground installation or the like is conceived. In this case, some vehicles are applied with AC-power regenerative brakes and some are power running. Therefore, there is a possibility that electric power supplied to the electric train is balanced in terms of electric power, and detection of a power failure on the side of ground equipment is delayed. Thus, when the power fails, it is necessary to swiftly and reliably detect a power failure and to promptly stop the regenerative braking operation not only on the side of the ground equipment but also on the side of the electric train.

When the reliability (stability) of the power failure detection is sought, the power failure detection is delayed, while when the speed in the power failure detection is increased, this results in precision not being maintained. Although the conventional technique cannot achieve control that satisfies these viewpoints, the controller of the present embodiment can provide control that satisfies both the reliability and the swiftness of the power failure detection.

Referring back to FIG. 1, if a power failure of the AC overhead wire 1 occurs, a power-failure detection signal 15 is output from the power failure detector 14 to the converter control device 9. The power-failure detection signal 15 is generated using the main-transformer output-current detection signal 7 detected by the current detector 6. The converter control device 9 completely stops the output of the gate enable signal 12 based on the input power-failure detection signal 15.

(Detailed Structure of Power Failure Detector)

A structure of the power failure detector 14 is explained next. FIG. 2 depicts a detailed structure of the power failure detector 14 shown in FIG. 1.

In FIG. 2, the power failure detector 14 includes a specific-frequency setting unit 25 that outputs a set value (hereinafter, "specific-frequency set value") 26 representing a specific frequency, a power-failure-detection setting unit 21 that outputs a power-failure-detection set value 22 that is a threshold for determining a power failure based on a current level, a specific-frequency-signal calculating unit 16 using the main-transformer output-current detection signal 7 and the specific-frequency set value 26 as input signals, a subtracter 19 that uses the main-transformer output-current detection signal 7 and a specific-frequency current signal 18 that is an output signal of the specific-frequency-signal calculating unit 16 as input signals, and a power-failure detecting unit 23 using the power-failure-detection set value 22 and a current deviation 20 that is an output signal of the subtracter 19 as input signals. An output of the power-failure detecting unit 23 is output as the power-failure detection signal 15.

The specific-frequency set value 26 output by the specific-frequency setting unit 25 and the power-failure-detection set value 22 output by the power-failure-detection setting unit 21 can be set at arbitrary values according to a frequency used in a feeding device, electric power to be supplied, the number of vehicles coupled and running together, a type of the coupled vehicles, and the like.

(Operation of Power Failure Detector)

An operation of the power failure detector 14 is explained next with reference to FIGS. 1 and 2. The specific-frequency-signal calculating unit 16 extracts a current component corresponding to the specific-frequency set value 26 from the main-transformer output-current detection signal 7 that is output from the current detector 6, and outputs the current component to the subtracter 19 as the specific-frequency current signal 18. The subtracter 19 subtracts the main-transformer output-current detection signal 7 from the specific-frequency current signal 18, and outputs the subtraction result to the power-failure detecting unit 23 as the current deviation 20.

In the power-failure detecting unit 23, the current deviation 20 and the power-failure-detection set value 22 are compared in terms of sizes with each other. When the current deviation 20 is greater than the power-failure-detection set value 22, it is determined that power fails, and the power-failure detection signal 15 is output to the converter control device 9. When the current deviation 20 is smaller than the power-failure-detection set value 22, it is determined that power does not fail, and the power-failure detection signal 15 is not output.

As described above, according to the controller for an AC electric train of the present embodiment, the power failure detector 14 provided in the electric-train control unit 8 swiftly and reliably detects a power failure of the AC overhead wire 1, and if a power failure is detected, the operation of the PWM converter 4 is stopped. Therefore, the regenerative braking operation of the electric train that is supplied with electric power from the AC overhead wire 1 does not function. As a result, AC electric power flowing through the AC overhead wire 1 is lowered, and a power failure on the side of the ground equipment is also detected swiftly and reliably.

In the power failure detector 14 shown in FIG. 2, the current signal (main-transformer output-current detection signal 7) flowing at the output of the main transformer 3 is compared with the specific-frequency set value 26, and the output of itself, i.e., the main-transformer output-current detection signal 7 is further subtracted from the comparison output. Therefore, an output difference between a non-power failure case and a power failure case can be increased (the output of the subtracter is small when power does not fail and the output of the subtracter is great when power fails). Therefore, the threshold (power-failure-detection set value 22) for detecting a power failure can be set at a large value, and detection sensitivity and detection precision can be enhanced. As a result, it is possible to suppress an erroneous detection and a detection delay of power failure caused by an operation of the plural vehicles, and it is possible to prevent a failure in the ground equipment such as a substation and to stabilize the vehicle travel.

INDUSTRIAL APPLICABILITY

As described above, the controller for an AC electric train according to the present invention is useful as an invention capable of detecting a power failure swiftly and reliably when a power failure is to be detected using a current signal.

The invention claimed is:

1. A controller for an AC electric train, comprising:
    a converter that converts an AC voltage input from an AC overhead wire through a transformer, into a DC voltage;
    an inverter that converts a DC voltage of the converter into an AC voltage and outputs the same to an AC motor;
    a current detector that detects an output current of the transformer; and
    a control unit including
        a converter control device having an input connected to said current detector and being configured to output a gate enable signal for keeping the DC voltage of the converter, based on a detection current signal received from the current detector, and
        a power failure detector having an input connected to said current detector and being configured to detect a power failure occurring in the AC overhead wire, based on the detection current signal received from the current detector, wherein
    the power failure detector includes:
    a specific-frequency-signal calculating unit that extracts a current component corresponding to a predetermined specific-frequency set value from the received detection current signal and outputs the extracted signal as a specific-frequency current signal;
    a subtracter that subtracts the received detection current signal from the specific-frequency current signal and outputs a result of subtraction as a current deviation; and
    a power-failure detecting unit that compares the current deviation and a predetermined power-failure-detection set value with each other, and outputs a power-failure detection signal when the current deviation is greater than the power-failure-detection set value, and wherein the converter control device stops the operation of the converter by stopping the gate enable signal based on the power-failure detection signal.

2. The controller for an AC electric train according to claim 1, wherein in the power failure detector, the specific-frequency set value and the power-failure-detection set value are variable.

* * * * *